Oct. 20, 1953   M. L. YEATER   2,656,256
METHOD OF TESTING A METALLIC SAMPLE
Filed March 18, 1946
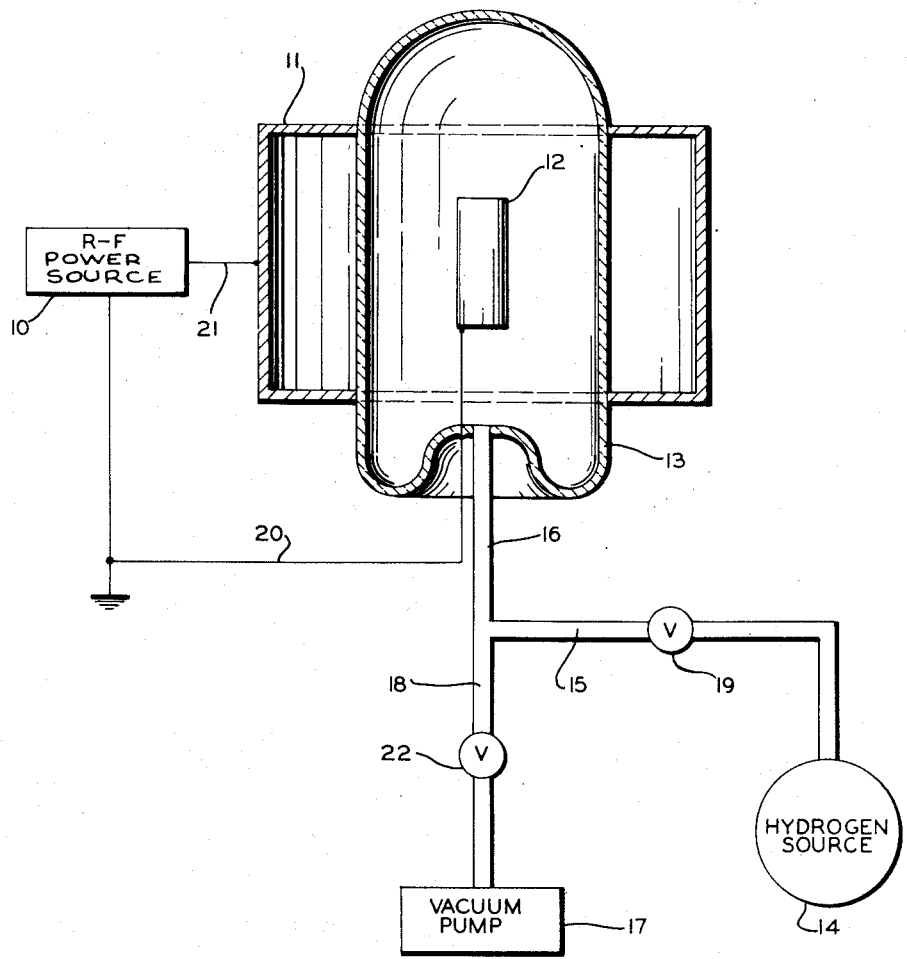
INVENTOR.
MAX L. YEATER
BY *M. O. Hayes*
ATTORNEY Patented Oct. 20, 1953

2,656,256

UNITED STATES PATENT OFFICE 2,656,256

METHOD OF TESTING A METALLIC SAMPLE

Max L. Yeater, Boulder, Colo., assignor, by mesne assignments, to the United States of America as represented by the Secretary of the Navy Application March 18, 1946, Serial No. 655,308

5 Claims. (Cl. 23—230)

This invention relates to a method of and system for testing metals and more particularly to a method of and system for determining the presence of occluded impurities in metals by means of atomic hydrogen bombardment.

Heretofore methods of and systems for testing for the presence of occluded impurities in metals were known but were time consuming and laborious. In some cases some impurities would even escape detection by other methods. The method of this invention is applicable to any substance which will combine with hydrogen to form a volatile compound. Certain of the impurities which may reside in the metals as occluded matter such as deeply imbedded nickel oxide and carbon may easily escape detection by other methods, one of which is spectroscopic analysis.

A primary object of the present invention is to provide a method of testing for occluded matter in metals which is comparatively rapid and relatively simple.

A further object of this invention is to provide a method for determining the presence of occluded impurities in metals by atomic hydrogen bombardment.

A still further object of this invention is to provide a system of simple construction for the testing for the presence of occluded matter in metals.

Another object of the present invention is to provide a system for the testing for the presence of occluded matter in metals by means of atomic hydrogen bombardment.

These and other objects will be apparent from the following specification when taken in connection with the accompanying drawing, in which:

The figure is a schematic diagram of a complete system for testing for occluded matter in metals according to the principles of this invention.

In the following specification this invention will be disclosed using nickel as the metal containing the occluded impurities. As is well known to those skilled in the art it will also be applicable to other metals.

The method consists essentially of exposing a sample of nickel to atomic hydrogen, and then identifying the volatile gas formed, which is composed of hydrogen and the occluded impurities in the nickel.

Although the apparatus of this invention may be made in several forms, it is herein disclosed in the figure as a radio frequency power source 10 connected to two electrodes 11 and 12 by means of leads 20 and 21. Electrode 11 is a cylindrical electrode surrounding that portion of the glass bulb 13 which contains a solid cylinder of the nickel being tested. In practice glass bulb 13 is formed around the metallic sample to be tested in any conventional manner. The sample to be tested acts as an electrode 12 and is mounted on and electrically connected to a lead 20, this electrode being at ground potential. Glass bulb 13 is connected to a source of hydrogen 14 by means of tubing 15 and 16, and to a vacuum pump 17 by means of tubes 16 and 18. Between the connecting point of tubes 15 and 16 and the hydrogen source 14 is located a stopcock 19. Likewise between the connecting point of tubes 15 and 18 and a vacuum pump 17 is located a stopcock 22.

In the testing process the previously disclosed system is operated in accordance with the following procedure: A small cylinder of nickel 12 is mounted in a glass bulb 13 by means of an electrode lead 20, which is fastened to one terminal of a radio frequency power source 10. The other terminal of the power source is connected to electrode 11. The glass bulb containing the nickel cylinder is then heated in an oven (not shown) to approximately four hundred degrees (400°) centigrade to drive off residual gases. The nickel cylinder is next heated by induction heating to approximately nine hundred degrees (900°) centigrade and held at this temperature for at least one to two minutes. The glass bulb is then evacuated by means of vacuum pump 17 and sealed off by stopcock 22. Hydrogen from tank 14 is admitted to the glass bulb until it contains a hydrogen filling at a pressure of .3 to .4 mm. mercury. Atomic hydrogen is then formed in the glass bulb by action of the radio frequency power source operating at a frequency of 6 megacycles per second and a voltage of four kilovolts. At intervals more hydrogen must be provided to replenish the hydrogen converted to atomic hydrogen and absorbed in the nickel cylinder, and subsequently reacting with the occluded impurities in the nickel. This procedure is continued for at least five to ten minutes. The glass bulb is then cooled to room temperature and fresh hydrogen admitted to replace the former filling. The glass bulb is then sealed off and heated by induction heating to nine hundred degrees (900°) centigrade for two minutes. This heating drives off the newly formed volatile compounds, formed by the occluded nickel impurities and atomic hydrogen, into the glass bulb. These volatile impurities in the hydrogen gas filling of the bulb will give a characteristic color to the gas filling when excited by the radio frequency power source output. One skilled in the art can identify the occluded matter present by the characteristic color of the volatile gas present. The volatile gaseous impurities could further and positively be identified by means of the spectograph, if such a method of identification should be found to be desirable.

While a particular embodiment of this invention has been disclosed and described, it is to be understood that various changes and modifications may be made therein without departing from the spirit and scope of the appended claims.

What is claimed is:

1. A method of testing a metallic sample to determine the presence of occluded impurities which can react with atomic hydrogen to form a volatile compound which comprises, heating the sample in a vacuum to drive off residual gases, enclosing said heated sample in a low pressure atmosphere of molecular hydrogen gas, ionizing said gas to form atomic hydrogen, cooling said sample to room temperature while maintaining constant the pressure of said molecular hydrogen gas atmosphere, reheating said sample in said hydrogen gas atmosphere, and applying radio frequency power to cause an electric glow discharge in said low pressure hydrogen atmosphere.

2. A method of testing a nickel sample to determine the presence of oxide and carbon impurities which can combine with atomic hydrogen to form a volatile compound which comprises the steps of heating the sample in an evacuated chamber to drive off residual gases, admitting molecular hydrogen gas into said chamber at a predetermined pressure while heating said sample to a second higher temperature, ionizing said molecular hydrogen gas to form atomic hydrogen, cooling said sample to room temperature while maintaining constant the pressure of said molecular hydrogen gas, reheating said sample in said hydrogen atmosphere to said second temperature, and applying radio frequency power to cause an electric glow discharge in said low pressure hydrogen atmosphere.

3. The method of testing a metallic sample to determine the presence of occluded impurities which can react with atomic hydrogen to form a volatile compound comprising, heating the sample in an evacuated chamber to approximately 400° C. to drive off residual gases, admitting molecular hydrogen gas to said chamber at a pressure at approximately 0.3 to 0.4 millimeters of mercury while raising the temperature of said chamber to approximately 900° C., applying radio frequency power to ionize said molecular gas to form atomic hydrogen for a time interval of five to ten minutes, cooling said sample to room temperature, admitting additional molecular hydrogen gas to said chamber to maintain a pressure of 0.3 to 0.4 millimeters of mercury, reheating said sample to approximately 900° C. to drive off volatile compounds of atomic hydrogen, and applying radio frequency power to cause an electric glow discharge in said atmosphere.

4. The method of testing a nickel sample to determine the presence of occluded oxide and carbon impurities which can combine with atomic hydrogen to form a volatile compound comprising, heating the sample in an evacuated chamber to approximately 400° C. to drive off residual gases, admitting molecular hydrogen gas to said chamber at a pressure at approximately 0.3 to 0.4 millimeters of mercury while raising the temperature of said chamber to approximately 900° C., applying radio frequency power to ionize said molecular hydrogen gas to form atomic hydrogen for a reaction period of five to ten minutes, adding hydrogen gas to hold pressure constant, cooling said sample to room temperature, admitting additional molecular hydrogen gas to said chamber to maintain a pressure of 0.3 to 0.4 millimeters of mercury, reheating said sample to approximately 900° C. to drive off volatile compounds of atomic hydrogen, and applying radio frequency power to cause an electric glow discharge in said atmosphere.

5. A method for testing a metallic sample to determine the presence of occluded impurities other than hydrogen which can react with atomic hydrogen to form a volatile compound which comprises, heating the sample in a closed chamber to approximately 400° C. to drive off residual gases, thereafter raising the temperature to approximately 900° C. and evacuating the chamber, introducing molecular hydrogen gas to said chamber, applying radio frequency power to ionize the molecular hydrogen gas to form atomic hydrogen, cooling the sample to room temperature, adding fresh molecular hydrogen gas to replace the hydrogen gas previously introduced, reheating the sample to approximately 900° C. to drive off volatile compounds of atomic hydrogen and occluded impurities, and applying radio frequency power to cause an electric glow discharge in the atmosphere surrounding the metallic sample.

MAX L. YEATER.

References Cited in the file of this patent

UNITED STATES PATENTS

| Number | Name | Date |
|---|---|---|
| 1,653,366 | Marden et al. | Dec. 20, 1927 |
| 1,957,808 | Rosecrans | May 8, 1934 |
| 2,023,707 | Spanner et al. | Dec. 10, 1935 |
| 2,049,947 | Cope | Apr. 4, 1936 |
| 2,143,982 | Hare et al. | Jan. 17, 1939 |
| 2,159,937 | Zworykin | May 23, 1939 |
| 2,279,231 | Gier, Jr. | Apr. 7, 1942 |
| 2,364,940 | Bies | Dec. 12, 1944 |
| 2,400,940 | McCollum | May 28, 1946 |
| 2,548,147 | Anderson et al. | Apr. 10, 1951 |

OTHER REFERENCES

Wooten "Ind. and Eng. Chem., Anal. Ed." vol. 14, No. 10, pages 835–838, November 1942.

Bobalek "Ind. and Eng. Chem., Anal. Ed." vol. 17, No. 9, pages 544–553, September 1945.

Stanley "Ind. and Eng. Chem., Anal. Ed." vol. 17, No. 11, pages 699–702, November 1945.